United States Patent

Zahn et al.

[11] Patent Number: 5,692,573
[45] Date of Patent: Dec. 2, 1997

[54] TOWING ARRANGEMENT

[75] Inventors: Werner Zahn, Hassloch; Joachim Heilmann, Bammental, both of Germany

[73] Assignee: Deere & Company, Moline, Ill.

[21] Appl. No.: 505,929

[22] Filed: Jul. 24, 1995

[30] Foreign Application Priority Data

Aug. 3, 1994 [DE] Germany .................. 44 27 399.1
Mar. 11, 1995 [DE] Germany .................. 195 08 839.5

[51] Int. Cl.$^6$ .................. B60D 1/46; A01B 59/042; A01B 63/10; A01B 63/102
[52] U.S. Cl. .................. 172/439; 280/479.1
[58] Field of Search .................. 172/439; 280/479.1, 280/478.1, 477

[56] References Cited

U.S. PATENT DOCUMENTS

| | | |
|---|---|---|
| 2,394,167 | 2/1946 | Pilz . |
| 2,826,433 | 3/1958 | Poole . |
| 3,702,198 | 11/1972 | Alley . |
| 3,863,955 | 2/1975 | Muncke et al. . |
| 4,148,497 | 4/1979 | Genty . |
| 4,542,913 | 9/1985 | Giesmann . |
| 5,263,734 | 11/1993 | Coenen et al. .......... 280/479.1 |

FOREIGN PATENT DOCUMENTS

| | | |
|---|---|---|
| 0308271 | 3/1989 | European Pat. Off. . |
| 664417 | 1/1952 | United Kingdom . |
| 1241083 | 7/1971 | United Kingdom . |
| 1505482 | 3/1978 | United Kingdom . |
| 1507499 | 4/1978 | United Kingdom . |
| 2208583 | 4/1989 | United Kingdom . |
| 2218890 | 8/1992 | United Kingdom . |

OTHER PUBLICATIONS 3 page document. The first page has "Drome Hitch "written in the upper right hand corner. In the lower right hand corner is the designation PN=103 this first page contains 4 photgraphs. the second two pages appear to be part of a parts manual. Applicants recognize this three page document to be prior art.

*Primary Examiner*—Terry Lee Melius
*Assistant Examiner*—Christopher J. Novosad

[57] ABSTRACT

Disclosed is a towing arrangement for a work vehicle. The towing arrangement includes a generally fore-and-aft extending positioning frame including a main frame and a guide frame. The main frame is pivotally connected to the vehicle for vertical pivotal movement between a raised transport position and a lowered position and the guide frame is supported by and movable longitudinally of the main frame and extendable from the free end of the frame by a hydraulic cylinder connected between the main frame and the slide frame. Lift arms are connected to the free end of the positioning frame for moving the frame between its raised and lowered positions. and a towing device is carried by the free end of the positioning frame. A retaining plate is secured to the rear of the vehicle and has a pair of rearwardly extending brackets secured thereto. A retaining lug is attached to one of the towing device and the free end of the positioning frame. The brackets and the retaining lug are provided with bores which are in alignment when the positioning frame is in the transport position for receiving a pin that transmits forces from the towing device directly to the vehicle.

9 Claims, 6 Drawing Sheets

TOWING ARRANGEMENT

BACKGROUND OF THE INVENTION

1. Technical Field

The invention relates generally to a towing arrangement for agricultural or industrial vehicles, and more particularly to a vertically pivotal hitch for attaching implements to a work vehicle

2. Background

It is known to provide work vehicles with a towing arrangement which includes a frame component that is pivotally connected to the work vehicle and can be raised or lowered by lifting means, for example, lift struts, in a vertical direction between an upper transport position and a lowered position. The free pivoting end of the frame component carries a projecting towing device, for example, a towing hook or drawbar. The towing device may be fixed to the frame component or guided by the frame component for sliding movement relative thereto and retained in at least one longitudinal vehicle position. Furthermore the towing arrangement contains retaining means through which the frame component can be retained in its transport position with respect to the vehicle body.

In one such towing arrangement an upper frame component is rigidly bolted to the rear axle differential housing of an agricultural tractor. The upper frame component carries a pivot shaft on which a lower frame component is supported so as to pivot vertically. The lower frame component is configured in the form of a mount in which a guide can be inserted. A double-acting hydraulic cylinder is arranged between the pivot shaft and the guide. Actuation of the hydraulic cylinder moves the guide within the lower frame component in the longitudinal direction of the vehicle. A projecting towing hook is attached to the guide with pins. Two pivoted hooks are attached to the sides of the upper frame component and are designed to cooperate with pins fastened to the lower frame component. If the lower frame component together with the guide and the towing hook are pivoted upward into the transport position the hooks engage the pins and secure the towing hook in the raised transport position. The forces transmitted from an implement tow bar to the towing hook are further transmitted through the guide and the lower frame component to the upper frame component that is fastened to the body of the tractor. This requires a correspondingly rigid configuration of the components. The lower frame component, in particular, is provided with lower reinforcing plates which limit the ground clearance of the tractor when the towing arrangement is raised and limit the coupling height when the towing arrangement is lowered, since the reinforcing plates are in contact with the ground and prevent the towing hook from penetrating into the ground.

SUMMARY OF THE INVENTION

An object of this invention is to provide a towing arrangement through which the above noted disadvantages are avoided.

A further object of the invention is to provide a towing arrangement with an improvement in ground clearance and coupling height.

Another object of the invention is to provide a towing arrangement which is simple and has compact components.

These and other objects are achieved by the present invention wherein a towing device is secured in its transport position directly to the vehicle body or to a component rigidly attached to the vehicle body so that the forces applied by an implement tow bar to the towing device are transmitted directly through the retaining arrangement to the vehicle body. Frame components that carry the towing device do not need to absorb any significant towing forces in the transport position, and can therefore be configured correspondingly slim (low material thickness). The reinforcements required to transmit towing forces can be omitted. For a towing arrangement thus retained, the vehicle ground clearance can thereby be improved. Furthermore a more favorable coupling height is made possible, since the free-standing end of the towing device is not hindered by reinforcements when penetrating the ground.

The solution proposed by the invention is particularly appropriate for a towing arrangement in which the frame component engages a guide that can be moved, if necessary, by a hydraulic cylinder in the longitudinal direction of the vehicle, and where the towing device is attached to the guide.

Preferably, the retaining arrangement contains at least one bracket applied to the upper side of the towing device (for example, molded in place, welded or bolted) with a horizontal bore that is transverse with respect to the longitudinal direction of the vehicle. The retaining arrangement is configured as an eye that is used for the direct attachment of the towing device to the vehicle body or to a vehicle component rigidly attached to it.

It is advantageous that at least one projecting bracket also be fastened to the vehicle body or to a component rigidly attached to it, the bracket containing a transverse bore corresponding to the transverse bore of the towing device. A retaining pin can be inserted into the transverse bores in order to retain the towing arrangement in the transport position.

If the towing device is configured as a towing hook open upward, it is appropriate to fasten at least one projecting bracket with a transverse bore configured as a hold-down directly or indirectly to the vehicle body above the towing hook. The hold-down engages the towing hook upon reaching the transport position and prevents the implement tow bar eye from escaping from the towing hook. By configuring the hold-down as a single or double bracket it can also be used to transmit forces originating in the implement tow bar in addition to its use as a hold-down.

Preferably the hold-down is configured as a double bracket, so that the bracket of the towing device is inserted between the two brackets of the hold-down in the transport position. Thereby the towing device can be supported against sideways forces in the transport position. The division of the hold-down accommodates the central engagement of the towing device. Thereby the hold-down takes on the simultaneous task of the transmission of the towing forces of the implement tow bar in addition to its original task.

It is obviously possible to arrange the brackets at the vehicle body and the towing device in the opposite sense from that described, so that one bracket, fastened to the vehicle body, is inserted between two brackets of the towing device.

According to a further feature of the invention, the invention includes at least one necked area in a generally cylindrical retaining pin, which is located in that axial region of the pin which corresponds with the width of the bracket of the towing device or its transverse bore when the retaining pin is inserted into the transverse bore. The necked area is preferably a flattening of the upper side of the pin whose axial length is bordered by end faces. The flattened upper side of the pin may be arched convex, in particular, a cylindrical configuration and generally exhibit the same radius of curvature as the remaining cylindrical surface of the pin, so that it conforms to the cylindrical inner surface of the transverse bore.

If the towing arrangement is raised to the transport position then the retaining pin is inserted into the transverse bores of the brackets of the towing device and the hold-down. The lifting struts are unloaded, so that the upper, cylindrical inner surface of the transverse bore of the towing device bracket is supported in the region of the necked area of the retaining pin. The two end faces that border on the necked area of the retaining pin extend radially beyond the transverse bore and are supported axially on the side surfaces of the brackets. Thereby the retaining pin is secured against any axial movement.

On the one hand the necked area represents an additional positioning aid. On the other hand it avoids an unintended release of the towing arrangement, since, before withdrawing the retaining pin, the lifting device must be actuated and the towing arrangement must be raised, in order to align the axis of the pin with the axis of the bore of the towing device bracket, whereby the contact of the end faces against the side surfaces of the brackets is removed.

Various other features and advantages of the invention will become apparent from a reading of the following detailed description when read in conjunction with the accompanying drawings.

DETAILED DESCRIPTION

Figure 1:
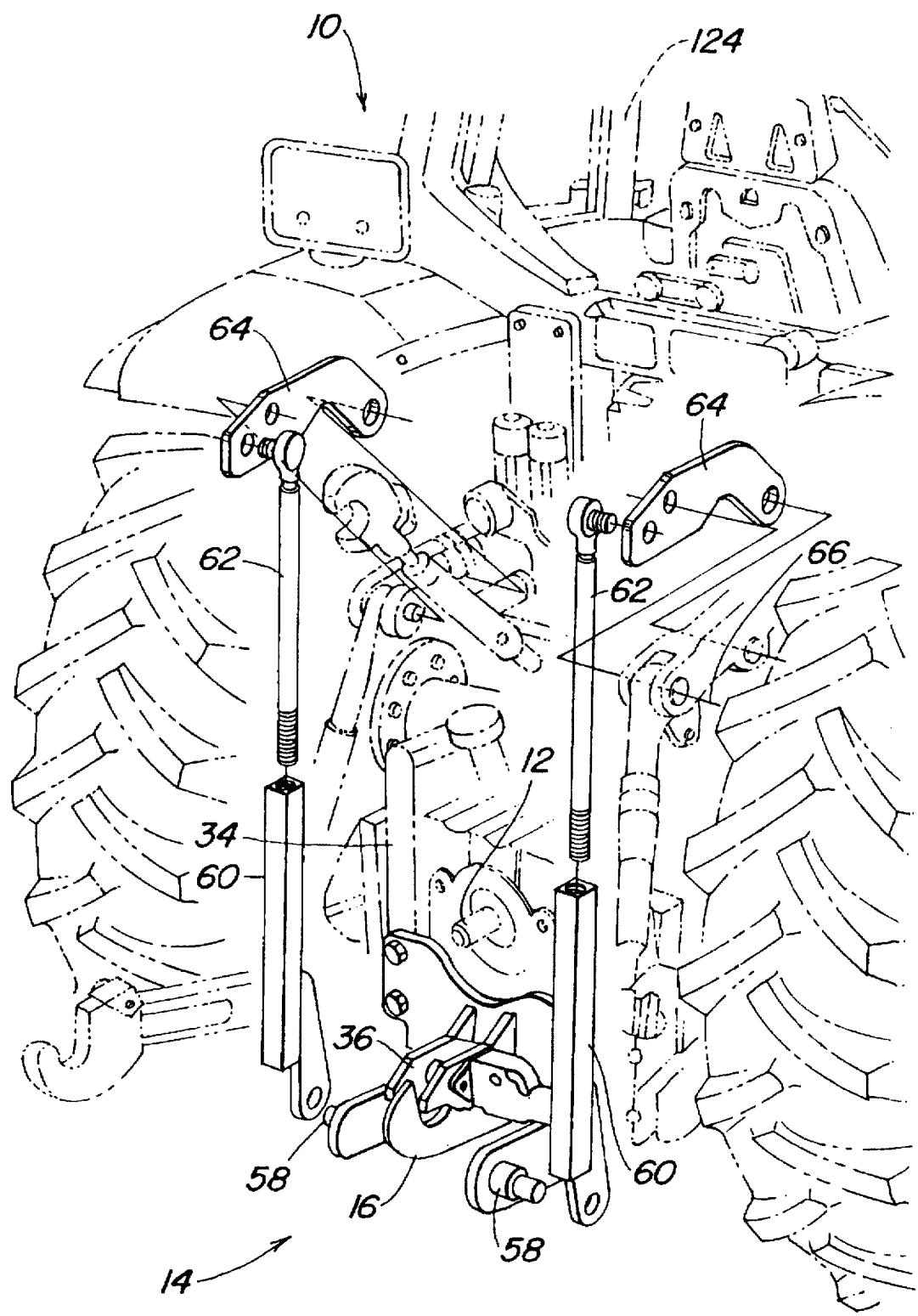
FIG. 1 is a perspective rear view of an agricultural tractor with a towing arrangement according to the present invention shown partially exploded.
Figure 3:
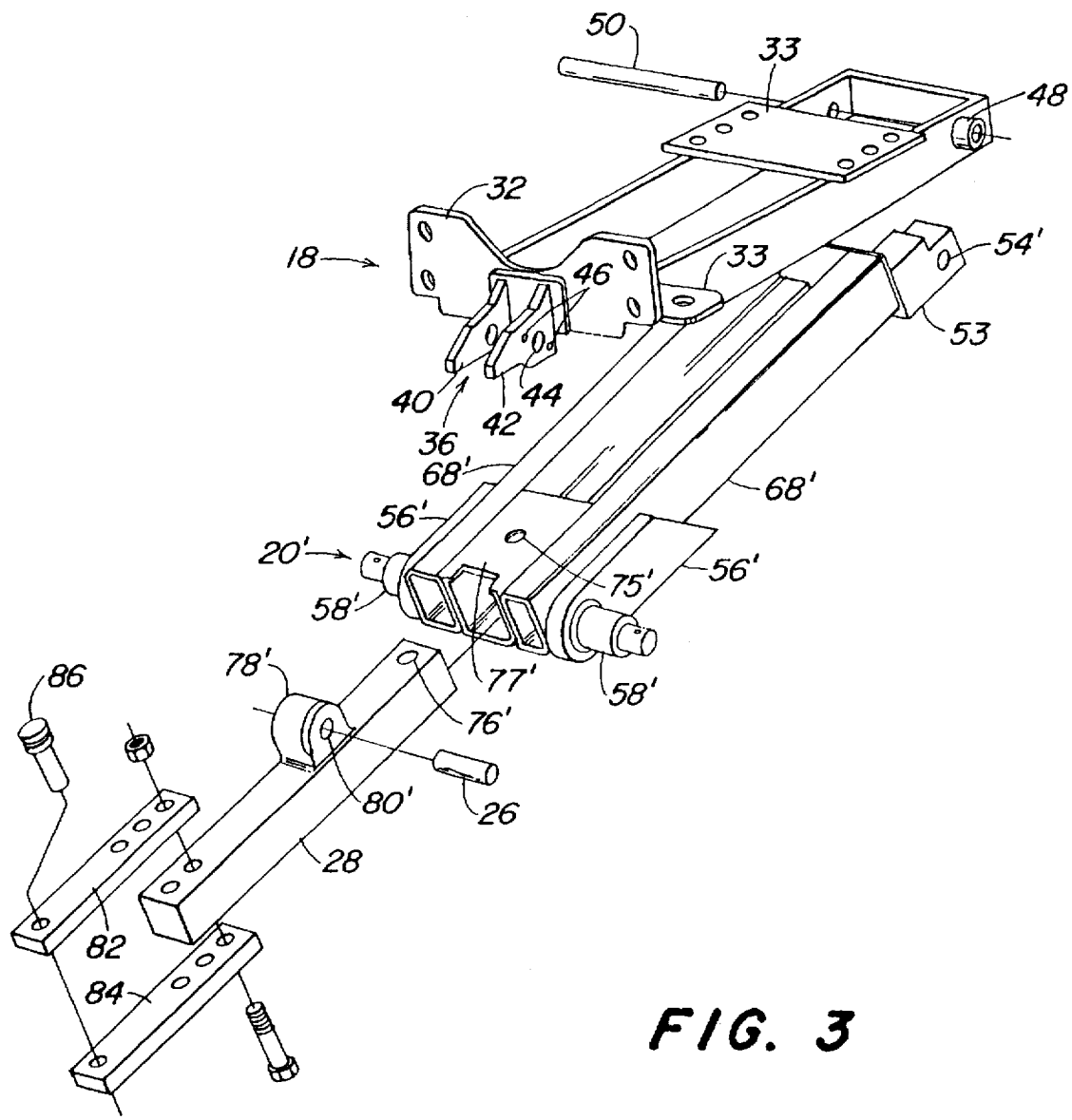
FIG. 3 is an exploded view of a second embodiment of the towing arrangement according to the invention.
Figure 4:
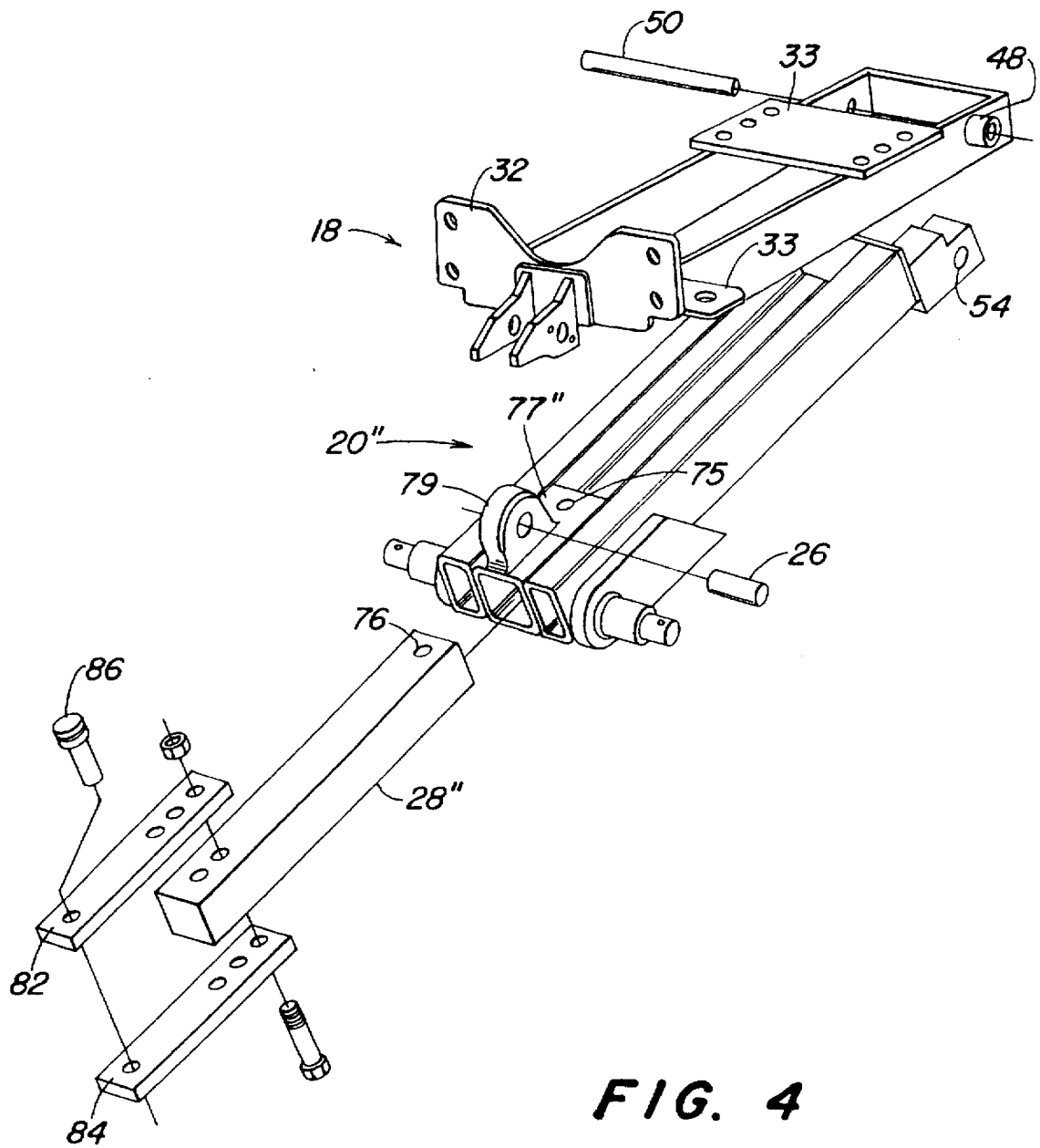
FIG. 4 is an exploded view of a third embodiment of the towing arrangement according to the invention.

In FIG. 1 a towing arrangement 14 is shown below a power take-off shaft 12 of an agricultural tractor 10. The principal component of the towing arrangement 14 is a towing hook 16, with which the coupling eye (not shown) of an implement tow bar (not shown), for example, the hitch of an attached wagon, can be coupled. The hook 16 can be pivoted downward to a lowered position from the transport position shown Referring now to FIG. 2, the towing arrangement 14 according to a first embodiment of the invention includes an upper frame component 18, a lower frame component 20, a guide 22, a towing hook 24, a retaining pin 26 and a hydraulic cylinder 30. FIGS. 3 and 4 reveal second and third embodiments of the invention, each of which includes a towing arrangement with an upper frame component 18 and a lower frame component 20' and 20", respectively. In place of the towing hook 24 shown in FIG. 2, a drawbar 28, 28" is provided in FIGS. 3 and 4. In FIGS. 3 and 4 the drawbar 28 directly engages the lower frame component 20' and 20", respectively, so that neither a guide nor a hydraulic cylinder are provided. The lower frame component, with or without the guide frame, will sometimes hereinafter be referred to as the positioning frame. Also similar components are identified with the same reference number in FIGS. 2, 3 and 4, but where the components in FIGS. 3 and 4 are not identical to the parts in FIG. 2 the numbers have been modified with a ', and " respectively. Furthermore, directional indications, such as "rear" and "front" refer to positions relative to the normal direction of forward movement of the tractor.

Figure 2:
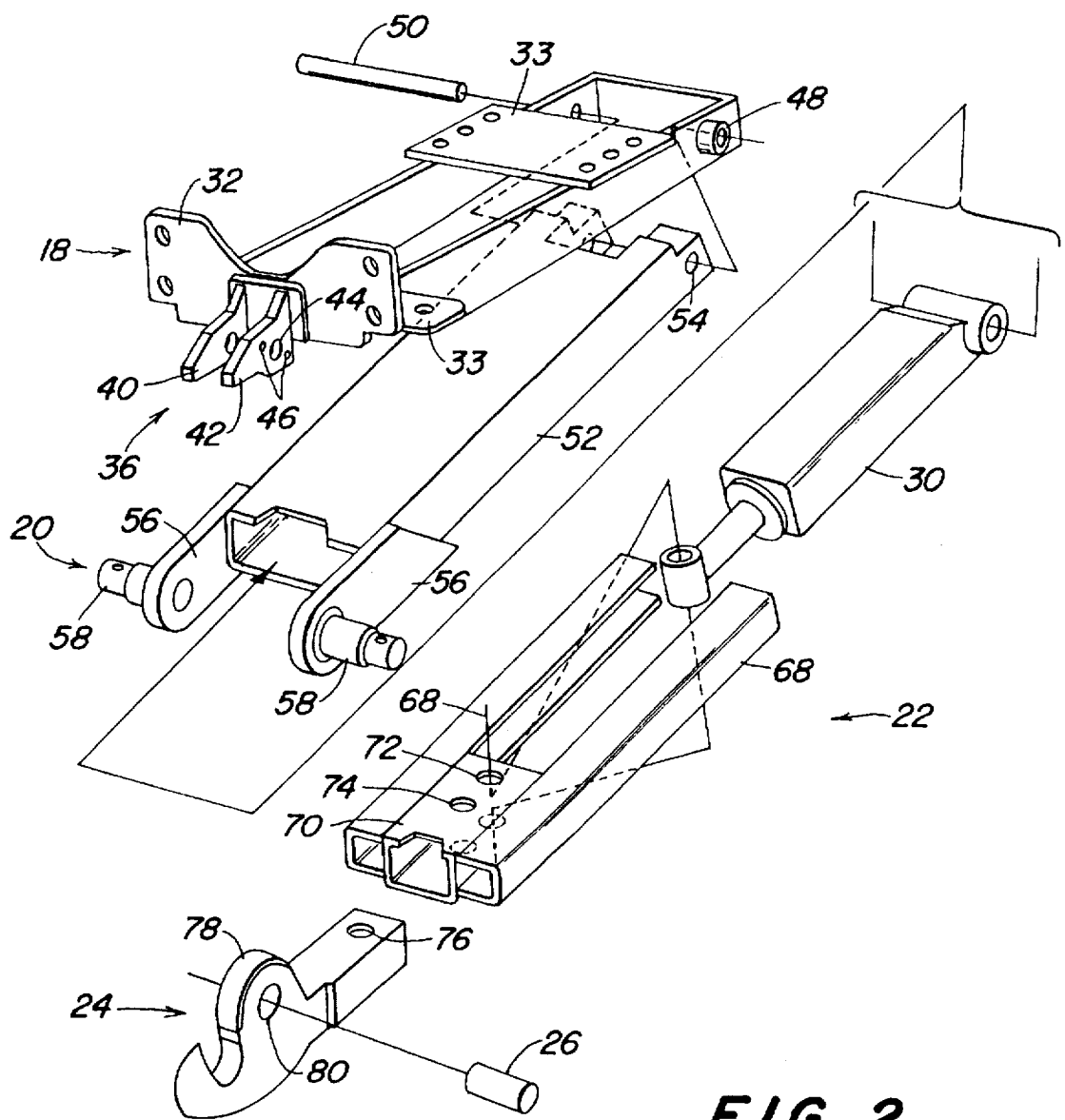
FIG. 2 is an exploded view of a first embodiment of the towing arrangement according to the invention.

According to FIG. 2 the upper frame component 18 contains a series of attachment plates 32, 33 with attachment bores that are used for the rigid attachment of the upper frame component 18 to the rear axle differential housing 34 of the tractor 10. The rear, vertical attachment plate 32 carries a hold-down 36 which consists principally of two vertical brackets 40, 42 that extend to the rear. Each of the brackets 40, 42 contains a transverse bore 44, which are in alignment with each other. Beyond that, one of the brackets 42 contains attachment bores 46 for a locking arrangement to be described below. A transverse, horizontally oriented sleeve 48 is attached in the forward region to each side of the upper frame component 18 and support a pivot shaft 50.

The lower frame component 20 is configured in the form of a generally rectangular channel 52. In its forward region it is provided with bearings 54 that engage the pivot shaft 50, so that its rear end can pivot vertically about the pivot shaft 50. At the rear, end of each side of the rectangular channel 52, reinforcements 56 are rigidly attached and each of which carries a pin 58 that is transverse, directed outward and oriented horizontally. The lower end of a lift linkage can be hooked to each of the pins 58 and is used to raise and lower the lower frame component 20.

Appropriate lift linkages are shown in FIG. 1. They consist of a lower lift rod 60 with a square cross section with a threaded bore in the upper end thereof into which a threaded lower end of an upper lift rod 62 can be screwed. The upper end of the upper lift rod 62 can be hooked into a power arm 64 which can be secured to hitch lift arms 66. The hitch lift arms are standard equipment on most agricultural tractors and are pivotal vertically by a hydraulic cylinder under the control of the tractor operator.

According to FIG. 2 the guide 22 can be inserted from the rear into the rectangular channel 52 of the lower frame component 20. The guide consists generally of two U-shaped guide rails 68 at its sides, whose rear regions are connected to each other by a tubular guide channel 70 with a generally rectangular cross section. A hydraulic cylinder 30 is connected between the pivot shaft 50 and the guide 22. The anchor end of the cylinder 30 is mounted on the shaft 50 and the rod end of the cylinder 30 is attached to the guide channel 70 by a bolt (not shown) which extends through a bore 72 in the guide channel and through the rod end of the cylinder 30. This is preferably a double-acting hydraulic cylinder 30, that can be operated from the vehicle cab and through which the guide 22 can be moved to the front and to the rear within the lower frame component 20.

As illustrated in FIG. 2, a towing device in the form of hook 24 is inserted into the guide channel 70 and can be secured by a pin (not shown) which can be inserted through a bore 74 in the guide channel 70 and through a bore 76 in the towing hook 24. This arrangement permits the towing hook 24 together with the guide 22 to be extended and retracted by means of the hydraulic cylinder 30 and to be pivoted in the vertical direction by means of the lift linkage.

A retaining lug 78 is formed on the upper side of the towing hook 24 and is provided with a horizontally oriented transverse bore 80. When the guide 22 is retracted and the lower frame component 20 is raised, the lug 78 of the towing hook 24 is located between the two brackets 40 and 42 of the upper frame component 18 and the transverse bores 44, 80 are aligned with each other so that retaining pin 26 can be inserted into these transverse bores to secure the towing hook 24 directly to the upper frame component 18 and thereby to the vehicle body. With this arrangement forces that are applied to the towing hook 24 are transmitted to the tractor differential case through the rear portion of the upper frame component 18.

In FIG. 2 the lug 78 is illustrated as being formed as an integral part of the towing hook 24, but it is to be understood that the lug can be secured to the towing hook in any suitable manner such as welding or by suitable bolts. Also, the schematically illustrated pin 26 in FIG. 2 is part of a locking arrangement which will be more fully described with reference to FIG. 5.

In the embodiment shown in FIG. 3 the upper frame component 18 is identical to the upper frame component shown in the FIG. 2 embodiment. The lower frame component is formed of two U-shaped guide rails 68', whose rear regions are connected to each other by a tubular guide channel 77 with a generally rectangular cross section. The forward region of each of the channels 68' is provided with a bearing block 53 having a bearing 54' that receives the pivot shaft 50, so that its rear end can pivot vertically about the pivot shaft 50. At the rear ends of the channels 68', reinforcements 56' are rigidly attached and each carries a pin 58' that is transverse, directed outward and oriented horizontally. The lower end of a lift linkage can be hooked to each of the pins 58' and is used to raise and lower the lower frame component 20'.

The drawbar 28 shown in FIG. 3 can be inserted directly into the guide channel 77' and can be secured therein with the aid of the bores 75' and 76' in the guide channel 77' and the drawbar 28, respectively, by a pin, not shown. The configuration of the eye-shaped bracket 78' of the drawbar 28 corresponds to the eye-shaped bracket 78 described in FIG. 2. Upper and a lower towing brackets 82, 84 can be bolted to the rear end of the drawbar 28. The eye, not shown, of an implement hitch can be positioned between the towing brackets and secured by a coupling pin 86.

It should be understood that although the embodiment illustrated in FIG. 2 is only shown with a towing hook 24 and the embodiment of FIG. 3 is only shown with a drawbar 28, the towing hook and drawbar are interchangeable in both embodiments.

The embodiment of the invention illustrated in FIG. 4 differs from the embodiment illustrated in FIG. 3 only in that an eye-shaped bracket 79 is fixed directly to the guide channel 77" in any suitable manner and the drawbar 28" is not provided with an eye-shaped bracket. In this situation the guide channel 77" must be made heavy enough to transfer loads from the drawbar to the eye-shaped bracket 79.

In FIG. 4 only a drawbar 78" is illustrated, but those skilled in the are will recognize that a towing hook could also be used in this embodiment of the invention.

Figure 5:
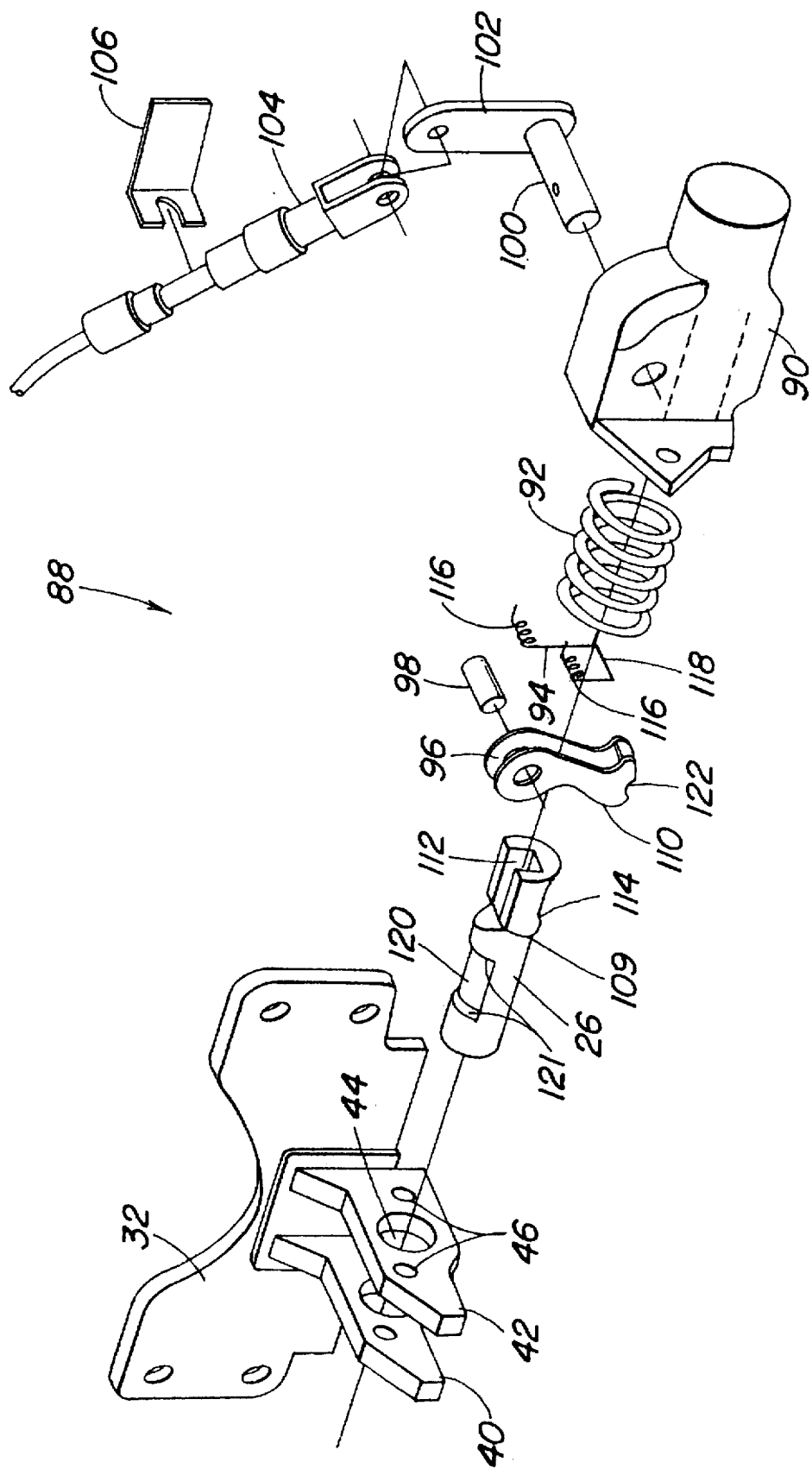
FIG. 5 is an exploded view of a locking arrangement usable with the towing arrangement according to the invention.

FIG. 5 illustrates a locking arrangement 88 which cooperates with the vertical attachment plate 32 of the upper frame component 18 to lock the lower frame component in its upper, transport position and to transfer the forces from the drawbar or to wing hook to the tractor chassis. The bracket 42 of the plate 32 is provided with two attaching bores 46, for example, threaded holes, that are used for the attachment of a housing 90 of the locking arrangement 88.

A helical compression spring 92, a torsion spring 94, a transmission lever 96 and the retaining pin 26 are inserted into the housing 90. The retaining pin 26 extends from the open end of the housing 90 and engages at least partially the transverse bores 44 of the brackets 42, 40. The compression spring 92 is in contact with the inner end face of the retaining pin 26 and is designed with respect to its length and spring force in such a way that it applies force to the retaining pin 26 over its entire path of movement and endeavors to force the retaining pin 26 out of the housing 90 into its locking position or to retain the locking pin in the locking position.

The transmission lever 96 is carried by a shaft 100 and is fixed against rotation thereon by a pin 98 which extends through bores provided in the lever 96 and shaft 100. The shaft 100 extends through the housing 90 and carries a lever 102 external of the housing 90 and to which is connected one end of a push-pull cable 104 whose sheath is seated on a chassis component 106. The other end of the push-pull cable 104 is connected to an actuating lever 108, see FIG. 6, which is used to control the rotary position of the transmission lever 96 and thereby also the position of the retaining pin. 26.

At its inner or right end, the retaining pin is provided with a longitudinal groove 112 and a transverse bore which extends from the bottom of the groove 112 to the opposite surface of pin. The transmissions lever 96 has a leg 110 which extends through the groove 112 and into the transverse bore 114. The torsion spring 94 includes two helical segments 116 that are concentric to the shaft 100 and whose ends are seated on the housing 90. The helical segments 116 are connected to each other by a strap 118 that is in contact with the transmission lever 96 and acts on the lever 96 to bias it in a clockwise direction as viewed in FIG. 5.

The retaining pin 26 is generally cylindrical and is provided with two segments of differing diameters between which an end face 109 is developed. The segment that engages the transverse bores 44, 80 of the brackets 40, 42, 78 has the somewhat smaller diameter so that the end face 109 engages the surface of the bracket 42 and prevents a further penetration of the retaining pin 26 into the transverse bores 44, 80.

In the central region of the segment with the smaller diameter, the retaining pin 26 is necked on the upper side, that is, its diameter is reduced. The necked area 120 is approximately the width of the bracket 78 or 79 of the towing hook 24 or of the drawbar 28, 28" and assumes a position that corresponds to the bracket 78 or 79 in the locked position. The necked area 120 is a flattened region on the upper side of the pin which is bordered axially by end faces 121. The flattened region on the upper side of the pin is arched cylindrically and has essentially the same radius of curvature as the remaining (lower) cylindrical surface of the pin. Thereby it conforms to the cylindrical inner surface of the transverse bore 80, 80'.

The free end of the leg 110 of the transmission lever 96 is provided with a recess 122 directed transverse to the direction of the retaining pin and forms an abutment. When the retaining pin 96 is moved into the housing 90 by the action of the lever 96, the leg 110 will start to move out of the bore 114 and the abutment will engage and be supported on an edge of the transverse bore 114 thereby establishes a stand-by position which can be overcome only when the retaining pin 26 is drawn or pressed somewhat further into the housing 90. On the one hand, this movement of the retaining pin 26 can be accomplished by the operating lever 108. On the other hand, if the towing device 24, 28 is raised to its transport position and the bracket 78 or 79 occupies its position between the two bracket 40 and 42, then the retaining pin 26 is forced back by the bracket 78 or 79 since its end extends somewhat into the gap between the two brackets 40 and 42 in the stand-by position and its end is rounded. By pulling or pressing back on the retaining pin 26 the stand-by position of the retaining pin 26 is unlocked.

Figure 6:
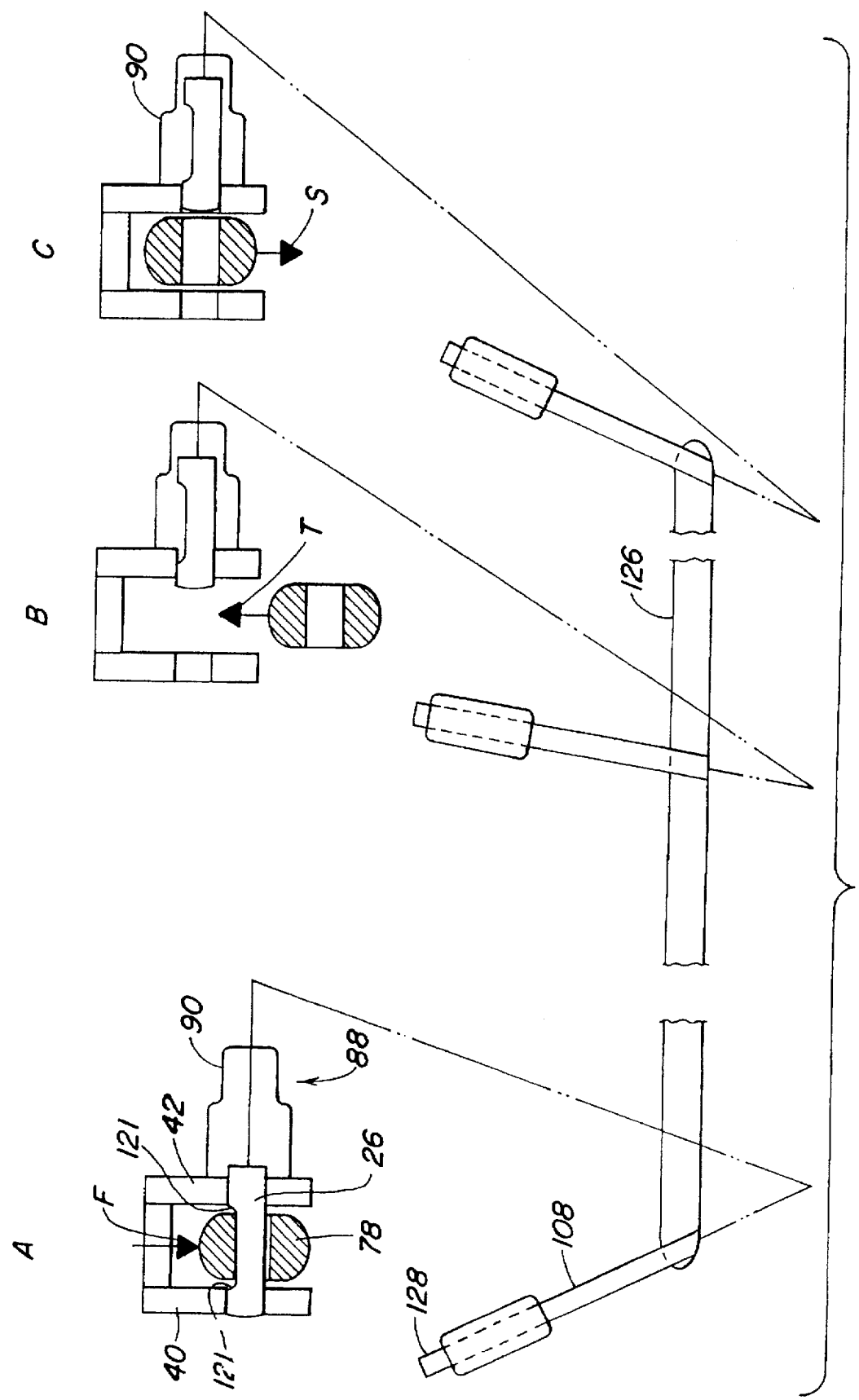
FIG. 6 is a schematic illustration of various positions of the locking arrangement and its operating lever.

FIG. 6 reveals three positions A, B and C of the retaining pin 26 and of the operating lever 108. In the upper region of FIG. 6 the locking arrangement 88 is shown, the lower region shows schematically the related position of the operating lever 108, which is guided in a slot 126 in the operator's console within the vehicle cab 124. Since a push-pull cable 104 is used, a unique relationship exists between the position of the operating lever 108 and the position of the retaining pin 26. Therefore the operating lever 108 in the vehicle cab 124 can be used as a visual indication of the condition of locking of the retaining pin 26.

FIG. 6 shows, at the left, the retained or locked position A of the locking arrangement 88, in which the operating lever 108 is in contact with one end of the slot 126, which forms a stop. The retaining pin 26 extends through the three transverse bores 44, 80 of the brackets 40, 78 or 79 and 42. Due to the force F acting from above upon the bracket 78 or 79 of the towing device 24, 28, the bracket 78 or 79 engages itself between the two end faces 121 in the region of the necked area 120 of the retaining pin 26, so that the retaining pin 26 is secured against sideways movement. This securing feature can be released by raising the bracket 78 or 79. The operating lever 108 can be secured in its position A by retaining means, not shown. This securing feature can be released when the operator presses down on a button 128 at the free end of the operating lever 108 against the force of a spring, not shown. This characteristic represents a further securing feature of the retaining pin 26 against unintentional unlocking.

FIG. 6 shows at the right the open position C' of the locking arrangement 88 in which the retaining pin 26 is drawn into the housing 90 by pivoting the operating lever 108 to the right end of the slot 126, so that the free end of the retaining pin 26 extends only into the transverse bore 44 of the bracket 42. Thereby the bracket 78 or 79 of the towing device 24, 28 is released, so that the towing device 24, 28 can move from its transport position to its lowered position under the force of gravity S and/or an actuation of the lifting device.

When the operator again releases the operating lever 108 after it has been brought to the open position C, then it is returned automatically to the stand-by position B that is shown at the center of FIG. 6 by the forces of the compression spring 92 and the torsion spring. 94 and that transmitted by the push-pull cable 104. In the stand-by position B the retaining pin 26 is supported by the abutment 122 of the transmission lever 96 in such a way that it does not move further out of the housing 90 and only penetrates with its free, rounded end into the gap between the two brackets 40, 42. If the bracket 78 or 79 is raised by the lifting arrangement into the transport position, as indicated by the arrow T, then the bracket 78 or 79 of the towing device 24, 28 pushes the retaining pin 26 somewhat back into the housing whereby the support on the abutment 122 is removed and the retaining pin 26 can fully enter the transverse bore 44, 80 under the force of the compression spring 92, the torsion spring 94 and/or the operating lever 108 (position A).

While the present invention has been described in conjunction with specific embodiments, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A towing arrangement for a work vehicle, the towing arrangement including a generally fore-and-aft extending positioning frame having a forward end and a rearward free end with its forward end pivotally connected to the work vehicle for vertical pivotal movement of the free end between a raised transport position and a lowered position, lifting means connected to the free end of the positioning frame for moving the frame free end between its raised and lowered positions, and a towing device carried by the free end of the positioning frame, characterized by a retaining plate secured to the rear of the vehicle, a retaining lug attached to one of the towing device and the free end of the positioning frame, and means for securing the lug to the plate when the free end of the positioning frame is in the transport position for transmitting draft forces from the towing device to the vehicle without the draft forces going through the complete positioning frame.

2. A towing arrangement as set forth in claim 1 characterized in that the retaining plate and lug are provided with apertures that align when the positioning frame is in the raised position and the means for securing includes pin means insertable through the apertures.

3. A towing arrangement as set forth in claim 1 characterized in that the retaining plate includes a pair of laterally spaced and vertically oriented brackets, the retaining lug is positioned between the brackets when the positioning frame is in the transport position, the brackets and lug are each provided with openings which align when the positioning frame is in the transport position, and the means for securing includes a retaining pin insertable through the openings.

4. A towing arrangement as set forth in claim 3 characterized in that the retaining lug is attached directly to the towing device.

5. A towing arrangement as set forth in claim 3 characterized in that the retaining lug is attached to the free end of the positioning frame.

6. A towing arrangement as set forth in claim 3 characterized in that the towing device includes an upwardly open towing hook and the brackets extend over the open hook when the positioning frame is in the transport position to prevent an implement towbar from escaping from the hook.

7. A towing arrangement as set forth in claim 3 characterized in that the retaining pin includes a segment intermediate its ends of reduced cross-sectional area, said segment terminating in shoulders joining its surface with the outer surface of the remainder of the pin, said segment lying in the area of the opening in the lug when the retaining pin is inserted through the openings in the brackets and lug.

8. A towing arrangement as set forth in claim 7 characterized by locking means engageable with the retaining pin to maintain the pin in a selected position.

9. A towing arrangement as set forth in claim 1 characterized in that the positioning frame includes fore-and-aft extending main and guide frames, the main frame has a forward end and a rearward free end and has its forward end pivotally connected to the vehicle, the guide frame has a forward end and a rearward extendable end and is supported by and movable longitudinally of the main frame and extendable from the free end of the main frame by a hydraulic cylinder connected between the main frame and the guide frame, the towing device is carried by the extendable end of the guide frame and the retaining lug is attached to one of the towing device and the extendable end of the guide frame.

* * * * *